2,962,355

CRYSTALLINE ZEOLITE E

Donald W. Breck, Tonawanda, and Nancy A. Acara, Kenmore, N.Y., assignors to Union Carbide Corporation, a corporation of New York No Drawing. Filed Dec. 13, 1957, Ser. No. 702,526

12 Claims. (Cl. 23—113)

This invention relates to a novel composition of matter, and to a process for preparing and utilizing this novel material. More particularly, the invention is concerned with a novel, synthetic member of the zeolite family.

The term "zeolite," in general, refers to a group of naturally occurring, hydrated, metal aluminosilicates, many of which are crystalline in structure. The synthetic material of the invention has a composition similar to certain of the natural crystalline zeolites. Accordingly, the term "synthetic zeolite" is applied to the materials prepared by the process of the invention. There are, however, significant differences between the synthetic and natural materials. For convenience and distinguishability, the synthetic material of the invention will be referred to hereinafter as "zeolite E."

Crystalline zeolites structurally consist basically of an open, three-dimensional framework of $SiO_4$ and $AlO_4$ tetrahedra. The tetrahedra are cross-linked by the sharing of oxygen atoms, so that the ratio of oxygen atoms to the total of the aluminum and silicon atoms is equal to two, or $O/(Al+Si)=2$. The negative electrovalence of tetrahedra containing aluminum is balanced by the inclusion within the crystal of cations, e.g., alkali metal or alkaline earth metal ions. This balance may be expressed by the formula $2Al/(2Na, 2K, 2L, Ca, Ba, Sr,$ etc.$)=1$. Moreover, it has been found that one cation may be replaced for another by suitable exchange techniques. Consequently, crystalline zeolites are often employed as ion-exchange agents.

It is also known that the crystal structures of many zeolites exhibit interstices of molecular dimensions. The interstitial spaces are generally occupied by water of hydration. Under proper conditions, viz., after at least partial dehydration, these zeolites may be utilized as efficient adsorbents whereby adsorbate molecules are retained within the interstitial spaces. Access to these channels is had by way of orifices in the crystal lattice. These openings limit the size and shape of the molecules that can be adsorbed. A separation of mixtures of foreign molecules based upon molecular dimensions, wherein certain molecules are adsorbed by the zeolite while others are refused, is therefore possible. It is this characteristic property of many crystalline zeolites that has led to their designation as "molecular sieves." In addition to molecular size and shape, however, other factors may also influence the selective adsorption of certain foreign molecules by molecular sieves. Among these factors are: the polarizability and polarity of the adsorbate molecules; the degree of unsaturation of organic adsorbates; the size and polarizing power of the interstitial cation; the presence of adsorbate molecules in the interstitial spaces; and the degree of hydration of the zeolite.

A number of synthetic crystalline zeolites have been prepared. They are distinguishable from each other, and from the naturally occurring material, on the basis of their composition, crystal structure, and adsorption properties. A suitable method for distinguishing these compounds, for example, is by their X-ray powder diffraction patterns. The existence of a number of zeolites having similar but distinguishable properties advantageously permits the selection of a particular member having optimum properties for a particular use.

The present invention has as its prime object the provision of a novel, synthetic, crystalline zeolite of the molecular sieve type. Another object is to provide a novel, synthetic, crystalline zeolite having useful ion-exchange and adsorption properties. A further object is to provide a convenient and efficient process for preparing the novel material of the invention.

The composition of zeolite E may stoichiometrically be expressed in terms of mole ratios of oxides. Thus a general formula for zeolite E may be represented as follows:

$$0.9\pm 0.1 M_{\frac{2}{n}}O : Al_2O_3 : 1.95\pm 0.1 SiO_2 : yH_2O$$

wherein "M" designates at least one exchangeable cation, as hereinbelow defined, "n" represents the valence of "M" and "y" may be any value from 0 to about 4. Minor variations in the mole ratios of these oxides, within the ranges indicated by the above formula, do not significantly change the crystal structure or physical properties of the zeolite. Likewise, the value of "y" is not necessarily an invariant for all samples of zeolite E. This is true because various exchangeable cations are of different size, and as no appreciable modification of the crystal lattice dimensions of the zeolite is effected by the exchange of these particular cations, more or less interstitial space should be available for the accommodation of water molecules. The value of "y" therefore depends upon the identity of the exchangeable cation, and also upon the degree of dehydration of the zeolite.

The exchangeable cations contemplated by the present invention include mono- and divalent metal ions, particularly those of groups I and II of the periodic table, as set forth in Webster's New Collegiate Dictionary, 1956 edition, page 626, such as calcium, lithium, magnesium, potassium, sodium, zinc ions etc., and the like, and other cations, for example, hydrogen and ammonium ions, which, with zeolite E, behave like the metal ions mentioned above in that they may be replaced for other exchangeable cations without causing a substantial alteration of the basic crystal structure of the zeolite.

In addition to composition, zeolite E may be identified and distinguished from other zeolites, and other crystalline substances, by its X-ray powder diffraction pattern, the data for which are set forth below in Table A. In obtaining the X-ray powder diffraction patterns, standard techniques were employed. The radiation was the K-alpha doublet of copper, and a Geiger counter spectrometer with a strip chart pen recorder was used. The peak heights, I, and the positions as a function of $2\theta$, where $\theta$ is the Bragg angle, were read from the spectrometer chart. From these, the relative intensities, $100 \ I/I_0$, where $I_0$ is the intensity of the strongest line or peak, and $d(A.)$ observed, the interplanar spacing in Angstrom units, corresponding to the recorded lines were determined.

TABLE A

| Bragg Angle, $2\theta$ | Relative Intensity, $100\ I/I_0$ | Interplanar Spacing, $d(\text{Å.})$ observed |
| --- | --- | --- |
| 9.3  | 100 | 9.53 |
| 12.4 | 16  | 7.13 |
| 16.2 | 8   | 5.47 |
| 21.0 | 18  | 4.23 |
| 23.0 | 6   | 3.86 |
| 25.1 | 4   | 3.54 |
| 25.7 | 12  | 3.46 |
| 26.1 | 4   | 3.41 |
| 26.7 | 5   | 3.34 |
| 28.4 | 14  | 3.14 |
| 29.0 | 10  | 3.08 |
| 29.8 | 18  | 3.00 |
| 31.3 | 23  | 2.86 |
| 34.1 | 7   | 2.63 |
| 39.2 | 8   | 2.30 |
| 40.4 | 9   | 2.23 |
| 48.0 | 4   | 1.89 |
| 48.2 | 4   | 1.89 |
| 54.9 | 5   | 1.67 |
| 56.8 | 3   | 1.62 |
| 62.9 | 3   | 1.48 |

The relative intensities and the positions of the X-ray lines are not substantially different for the various ion-exchange forms of zeolite E. The appearance of a few minor lines and the disappearance of others from one form of zeolite E to another may also occur, and, like the slight changes in intensities and positions of some of the X-ray lines, may be attributed to the different sizes and numbers of exchangeable cations present in the various forms of the zeolite. The spatial arrangement of silicon, oxygen, and aluminum atoms, i.e., the arrangement of the $AlO_4$ and $SiO_4$ tetrahedra, are essentially identical in all forms of zeolite E. The particular X-ray technique and/or apparatus employed, the humidity, the temperature, the orientation of the powder crystals, and oher vriables all of which are well known and understood to those skilled in the art of X-ray crystallography or diffraction, may also cause some variations in the intensities and positions of the X-ray lines. Thus, the X-ray data given herein to identify zeolite E are not to exclude those materials which, due to some variable mentioned above or otherwise known to those skilled in the art, fail to show all of the tabulated X-ray lines, or show a few extra ones that are permissible to the crystal system of the zeolite, or show a slight change in intensity or shift in position of some of the X-ray lines as set forth in Table A.

Although there are a number of exchangeable cations that may be present in zeolite E, it is preferred to synthesize the zeolite in a form in which potassium and sodium ions are included as the exchangeable cation. The reactants accordingly employed are readily available and generally water soluble. The potassium and sodium ions in the zeolite may then conveniently be replaced by other exchangeable cations, as will be shown below, thereby yielding isomorphic forms of the zeolite.

In an embodiment of the present invention, the zeolite E is prepared by suitably heating an aqueous potassium-sodium aluminosilicate mixture whose compositions, expressed in terms of mole ratios of oxides, falls within the following ranges:

$Na_2O/(K_2O+Na_2O)$ of about 0.5
$(K_2O+Na_2O)/SiO_2$ of about 0.8
$SiO_2/Al_2O_3$ of about 2
$H_2O/(K_2O+Na_2O)$ of about 20 whereby the desired product is crystallized out.

In making zeolite, the usual method comprises dissolving sodium aluminate and alkali, viz., sodium and potassium hydroxide, in water, and adding this solution to a water solution of sodium silicate, or preferably to a water silicate mixture derived at least in part from an aqueous colloidal silica sol. The resultant mixture is placed in a container made, for example, of metal or glass. The container should be closed to prevent loss of water. The reaction mixture is then stirred to insure homogeneity.

For best results, the crystallization procedure is carried out at a temperature of approximately 100° C. The zeolite may, however, be satisfactorily prepared at temperatures of from about 75° C. to about 120° C., the pressure being atmospheric or at least that corresponding to the vapor pressure of water in equilibrium with the mixture of reactants. Any suitable heating apparatus, e.g., an oven, sand bath, oil bath, or jacketed autoclave, may be used. Heating is continued until the desired crystalline zeolite product is formed. The zeolite crystals are then filtered off and washed to separate them from the reactant mother liquor. The zeolite crystals should be washed, preferably with distilled water, until the effluent wash water, in equilibrium with the product, has a pH of between about 9 and 12. As the zeolite crystals are washed, the exchangeable cation of the zeolite may be partially removed, and is believed to be replaced by hydrogen cations. If the washing is discontinued when the pH of the effluent wash water is about 10, the $(K_2O+Na_2O)/Al_2O_3$ molar ratio of the crystalline product will be between about 0.9 and 1.0. Excessive washing will result in a somewhat lower value for this ratio, while insufficient washing may leave slight excesses of potassium and sodium associated with the product. Thereafter, the zeolite crystals may be dried, conveniently in a vented oven. The product is thereby obtained having a composition, expressed in terms of mole ratios of oxides corresponding to the formula:

$$0.9\pm0.1[xK_2O:(1-x)Na_2O]:Al_2O_3:1.95\pm0.1SiO_2:yH_2O$$

wherein "$x$" may be any value from about 0.5 to about 0.8, and "$y$" may be any value from 0 to about 4.

Typical of the manner in which zeolite E may be prepared are the following examples.

Example I 50 grams of $Al_2O_3 \cdot 3H_2O$ were dissolved in a solution containing 26.8 grams of potassium hydroxide and 19.1 grams of sodium hydroxide in 55.1 ml. of water. This solution was then added to 130 grams of an aqueous colloidal silica sol containing 29.5 percent silica by weight. The resulting mixture, having a composition, expressed in terms of mole ratios of oxides, as follows:

$$0.75K_2O:0.75Na_2O:Al_2O_3:2SiO_2:30H_2O$$

was stirred until homogeneous. Crystallization of the desired zeolite product was carried out by heating the reactant mixture in a sealed glass jar at a temperature of 100° C. for approximately 64 hours. The crystalline product which formed had thereupon settled to the bottom of the jar, and the reactant mother liquor was clear. The crystalline product was then filtered, washed with water until the effluent wash water had a pH of about 10.5 to 11.0, and dried. Analysis of the product showed it to be a zeolite having a composition, expressed in terms of mole ratios of oxides, corresponding to the formula:

$$0.61K_2O:0.25Na_2O:Al_2O_3:2.03SiO_2:3.5H_2O$$

X-ray analysis of the product indicated a powder diffraction pattern characteristic of zeolite E, as set forth above in Table A. Electron micrographs of the product showed the crystal habit of the zeolite to be cubic, with cubes ranging in size from about 2 to about 4 microns along a side.

Example II 5.00 grams of $Al_2O_3 \cdot 3H_2O$ were dissolved in a solution containing 2.68 grams of potassium hydroxide and 1.91 grams of sodium hydroxide in 5.51 ml. of water. This solution was then added to 13.0 grams of an aqueous colloidal silica sol containing 29.5 percent silica by weight.

The resulting mixture, having a composition, expressed in terms of mole ratios of oxides, corresponding to the formula:

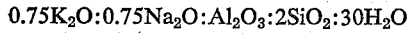
$$0.75K_2O:0.75Na_2O:Al_2O_3:2SiO_2:30H_2O$$

was stirred until homogeneous. Crystallization of the desired zeolite product was carried out by heating the reactant mixture in a sealed glass jar at a temperature of 100° C. for approximately 41 hours. The crystalline product which formed had thereupon settled to the bottom of the jar, and the reactant mother liquor was clear. The crystalline product was then filtered, washed with water until the effluent wash water had a pH of about 10.5 to 11.0, and dried. Analysis of the product showed it to be a zeolite having a composition, expressed in terms of mole ratios of oxides, corresponding to the formula:

$$0.45K_2O:0.41Na_2O:Al_2O_3:1.9SiO_2:3.4H_2O$$

X-ray analysis of the product indicated a powder diffraction pattern characteristic of zeolite E, as set forth about in Table A.

The replacement of the exchangeable cation present in zeolite E at least in part by other cations may be accomplished by conventional ion-exchange techniques. A preferred, continuous method is to pack zeolite E into a series of vertical columns with suitable supports at the bottom; successively pass through the beds, at room temperature, a water solution of a soluble salt of the cation to be introduced into the zeolite; and change the flow from the first bed to the second as the zeolite in the first bed becomes ion-exchanged to the extent desired. To obtain sodium exchange, for example, a water solution of sodium chloride or dilute sodium hydroxide is suitable; for calcium, lithium, magnesium, zinc, ammonium exchange, and the like, water solutions of the chlorides, sulfates or nitrates of these cations may be utilized. While it is more convenient to use water soluble compounds of the exchangeable cations, other solutions containing the desired cations may also be employed. Moreover, particularly good results may be obtained by the utilization of an exchanging solution having a pH of between about 5 and 12.

In a typical exchange, 7.3 grams of zeolite E, obtained as described above in Example I, were admixed with an aqueous solution containing 28.8 grams of calcium chloride in 500 ml. of water. The mixture was heated at approximately boiling temperature, with continued agitation, for about 30 minutes, and the zeolite crystals thereupon separated from the exchanging solution by filtration. The exchange process was repeated, and the mixture allowed to stand for a period of about 16 hours. The zeolite crystals were then refiltered, washed with distilled water, and dried. Analysis of the product indicated that approximately 89.4 percent of the potassium and sodium ions originally present in the zeolite had been replaced by calcium ions. In other exchanges conducted in a similar manner, 7.3 grams of the zeolite were treated with the following solutions: (a) 16 grams of lithium sulfate monohydrate in 500 ml. of water, resulting in the exchange of approximately 47.2 percent of the potassium and sodium ions by lithium ions; (b) 50.9 grams of magnesium chloride hexahydrate in 500 ml. of water, resulting in the exchange of approximately 51.8 percent of the potassium and sodium ions by magnesium ions; and (c) 74.4 grams of zinc nitrate hexahydrate in 500 ml. of water, resulting in the exchange of approximately 82.3 percent of the potassium and sodium ions by zinc ions.

For satisfactory use as an adsorbent, zeolite E should be activated by at least partial dehydration. Such activation may be performed, for example, by heating the zeolite to a temperature of approximately 130° C. under atmospheric or reduced pressure, or by maintaining the zeolite at room temperature under vacuum. Unlike common adsorbents, such as charcoal and silica gel, which show adsorption selectivities based primarily on the boiling point or critical temperature of the adsorbate, activated zeolite E exhibits a selectivity based on the size, degree of unsaturation, polarity, and shape of the adsorbate molecule. Adsorption by zeolite E is generally limited to small, polar molecules.

Another property of zeolite E which contributes to its usefulness is that of adsorbing relatively large quantities of adsorbate at either very low pressures or concentrations. The novel material of this invention may therefore be utilized as a selective adsorbent in numerous gas or liquid separation processes whereby small, polar molecules, particularly water, are separated from mixtures with other materials. The zeolite may also find use in cyclic adsorption-desorption processes for water, and possibly under adsorbates.

Samples of zeolite E which had been initially activated by dehydration at a temperature of approximately 130° C. under vacuum, were tested to determine their adsorption properties. The data thereby obtained are set forth below in Table B. The table is illustrative of the results obtained utilizing samples of zeolite E both in the unexchanged form (K—NaE) obtained as described above in Example I, and in isomorphic forms, obtained by the replacement of varying amounts of the potassium and sodium ions originally present in the zeolite with other exchangeable cations, viz., an 89 percent calcium exchanged zeolite E (CaE), a 52 percent magnesium exchanged zeolite E (MgE), and a 47 percent lithium exchanged zeolite E ($Li_2E$). The adsorption properties were measured in a McBain adsorptive system. The zeolite samples were placed in light aluminum buckets suspended from quartz springs. They were activated in situ, and the gas or vapor under test was then admitted to the system. The gain in weight of the adsorbent was measured by the spring extensions as read by a cathetometer. In Table B the pressure given for each adsorption is the pressure of the adsorbate. The term "Weight percent adsorbed" refers to the percentage increase in the weight of the adsorbent.

TABLE B

| Adsorbate | Temp. (° C.) | Pressure, mm. Hg | Weight Percent Adsorbed | | | |
|---|---|---|---|---|---|---|
| | | | K–NaE | CaE | MgE | $Li_2E$ |
| $H_2O$ | 25 | 1 | 6.3 | 12.4 | 17.0 | 14.0 |
| | | 4.5 | 15.9 | 15.5 | 20.4 | 18.1 |
| | | 25 | 19.5 | 18.6 | 22.8 | 20.2 |
| $O_2$ | −196 | 100 | 0.4 | 1.8 | 0.6 | 0.4 |
| $CO_2$ | 25 | 710 | 1.6 | | | |
| $C_2H_4$ | 25 | 687 | 0.1 | | | |
| $SO_2$ | 25 | 708 | 3.0 | | | |

From the Table B it may be seen, for example, that the activated form of zeolite E, acting as a molecular sieve may permit the separation of small, polar molecules such as those of water from a mixture with other molecules such as those of oxygen, carbon dioxide or ethylene. The table also indicates that ion-exchange generally improves the adsorptive capacity of zeolite E for water at low pressure.

Zeolite E may be used as an adsorbent for the purposes indicated above in any suitable form. For example, a column of powder crystalline material may give excellent results as may a pelleted form obtained by pressing into pellets a mixture of zeolite E and a suitable bonding agent such as clay.

What is claimed is:

1. A synthetic, crystalline zeolite having a composition, expressed in terms of mole ratios of oxides, as follows:

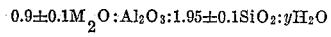
$$0.9\pm0.1\frac{M_2}{n}O:Al_2O_3:1.95\pm0.1SiO_2:yH_2O$$

wherein "M" represents at least one exchangeable cation selected from the group consisting of metal ions of groups I and II of the periodic table, hydrogen ions, and ammonium ions, and "y" is any value from 0 to about 4, said synthetic, crystalline zeolite having an X-ray powder diffraction pattern essentially as shown in the following table:

| Interplanar spacing $d$(A.) observed: | Relative intensity 100 $I/I_0$ |
|---|---|
| 9.53 | 100 |
| 7.13 | 16 |
| 5.47 | 8 |
| 4.23 | 18 |
| 3.46 | 12 |
| 3.14 | 14 |
| 3.08 | 10 |
| 3.00 | 18 |
| 2.86 | 23 |
| 2.23 | 9 |

2. A synthetic, crystalline zeolite according to claim 1, wherein at least a substantial portion of the exchangeable cations are potassium ions.

3. A synthetic, crystalline zeolite according to claim 1, wherein at least a substantial portion of the exchangeable cations are sodium ions.

4. A synthetic, crystalline zeolite according to claim 1, wherein at least a substantial portion of the exchangeable cations are magnesium ions.

5. A synthetic, crystalline zeolite according to claim 1, wherein at least a substantial portion of the exchangeable cations are calcium ions.

6. A synthetic, crystalline zeolite according to claim 1, wherein at least a substantial portion of the exchangeable cations are zinc ions.

7. A synthetic, crystalline zeolite having a composition, expressed in terms of mole ratios of oxides, as follows:

$$0.9 \pm 0.1 [xK_2O:(1-x)Na_2O]:Al_2O_3:1.95 \pm 0.1 SiO_2:yH_2O$$

wherein "$x$" is any value from about 0.5 to about 0.8 and "$y$" is any value from 0 to about 4, said synthetic, crystalline zeolite having an X-ray powder diffraction pattern essentially as shown in the following table:

| Interplanar spacing $d$(A.) observed: | Relative intensity 100 $I/I_0$ |
|---|---|
| 9.53 | 100 |
| 7.13 | 16 |
| 5.47 | 8 |
| 4.23 | 18 |
| 3.46 | 12 |
| 3.14 | 14 |
| 3.08 | 10 |
| 3.00 | 18 |
| 2.86 | 23 |
| 2.23 | 9 |

8. A process for preparing a crystalline zeolite having a composition, expressed in terms of mole ratios of oxides, as follows:

$$0.9 \pm 0.1 [xK_2O:(1-x)Na_2O]:Al_2O_3:1.95 \pm 0.1 SiO_2:yH_2O$$

wherein "$x$" is any value from about 0.5 to about 0.8 and "$y$" is any value from 0 to about 4, said crystalline zeolite having an X-ray powder diffraction pattern essentially shown in the following table:

| Interplanar spacing $d$(A.) observed: | Relative intensity 100 $I/I_0$ |
|---|---|
| 9.53 | 100 |
| 7.13 | 16 |
| 5.47 | 8 |
| 4.23 | 18 |
| 3.46 | 12 |
| 3.14 | 14 |
| 3.08 | 10 |
| 3.00 | 18 |
| 2.86 | 23 |
| 2.23 | 9 | which process comprises preparing an aqueous potassium-sodium aluminosilicate mixture whose composition expressed in terms of mole ratios of oxides, falls within the following ranges:

$Na_2O/(K_2O+Na_2O)$ of about 0.5
$(K_2O+Na_2O)SiO_2$ of about 0.8
$SiO_2/Al_2O_3$ of about 2
$H_2O/(K_2O+Na_2O)$ of about 20 and maintaining such mixture at a temperature of between about 75° C. and about 120° C. until the desired crystalline zeolite product is formed.

9. A process for preparing a crystalline zeolite having a composition, expressed in terms of mole ratios of oxides, as follows:

$$0.9 \pm 0.1 [xK_2O:(1-x)Na_2O]:Al_2O_3:1.95 \pm 0.1 SiO_2:yH_2O$$

wherein "$x$" is any value from about 0.5 to about 0.8 and "$y$" is any value from 0 to about 4, said crystalline zeolite having an X-ray powder diffraction pattern essentially as shown in the following table:

| Interplanar spacing $d$(A.) observed: | Relative intensity 100 $I/I_0$ |
|---|---|
| 9.53 | 100 |
| 7.13 | 16 |
| 5.47 | 8 |
| 4.23 | 18 |
| 3.46 | 12 |
| 3.14 | 14 |
| 3.08 | 10 |
| 3.00 | 18 |
| 2.86 | 23 |
| 2.23 | 9 | which process comprises preparing an aqueous potassium-sodium aluminosilicate mixture whose composition, expressed in terms of mole ratios of oxides, falls within the following ranges:

$Na_2O/(K_2O+Na_2O)$ of about 0.5
$(K_2O+Na_2O)/SiO_2$ of about 0.8
$SiO_2/Al_2O_3$ of about 2
$H_2O/(K_2O+Na_2O)$ of about 20 maintaining such mixture at a temperature of approximately 100° C. until the desired crystalline zeolite product is formed, and separating the resulting crystals from the reactant mother liquor.

10. A process for preparing a crystalline zeolite having a composition, expressed in terms of mole ratios of oxides, as follows:

$$0.61 K_2O:0.25 Na_2O:Al_2O_3:2.03 SiO_2:3.5 H_2O$$

said crystalline zeolite having an X-ray powder diffraction pattern essentially as shown in the following table:

| Interplanar spacing $d$(A.) observed: | Relative intensity 100 $I/I_0$ |
|---|---|
| 9.53 | 100 |
| 7.13 | 16 |
| 5.47 | 8 |
| 4.23 | 18 |
| 3.46 | 12 |
| 3.14 | 14 |
| 3.08 | 10 |
| 3.00 | 18 |
| 2.86 | 23 |
| 2.23 | 9 | which process comprises preparing an aqueous potassium-sodium aluminosilicate mixture having a composition expressed in terms of mole ratios of oxides, as follows:

$$0.75 K_2O:0.75 Na_2O:Al_2O_3:2 SiO_2 30 H_2O$$

maintaining such mixture at a temperature of about 100°

C. until crystals are formed having the desired composition, and separating the crystals from the reactant mother liquor.

11. A synthetic crystalline zeolite having a composition according to claim 1 wherein "Y" is a value for the reduced degree of hydration obtained when the hydrated form of said zeolite is heated to about 130° C.

12. A process according to claim 8 which includes heating said crystalline zeolite product to a temperature of about 130° C. under dehydrating conditions whereby the evolved water of hydration is carried away.

References Cited in the file of this patent

UNITED STATES PATENTS

| 2,283,172 | Bates | May 19, 1942 |
| 2,882,243 | Milton | Apr. 14, 1959 |
| 2,882,244 | Milton | Apr. 14, 1959 |

OTHER REFERENCES

Mellor: "Comprehensive Treatise on Inorganic and Theoretical Chemistry," vol. 6, page 568, part 2, first paragraph.

Barrer et al.: "J. Chem. Soc.," 1466–75 (1953).